United States Patent Office 3,012,850
Patented Dec. 12, 1961

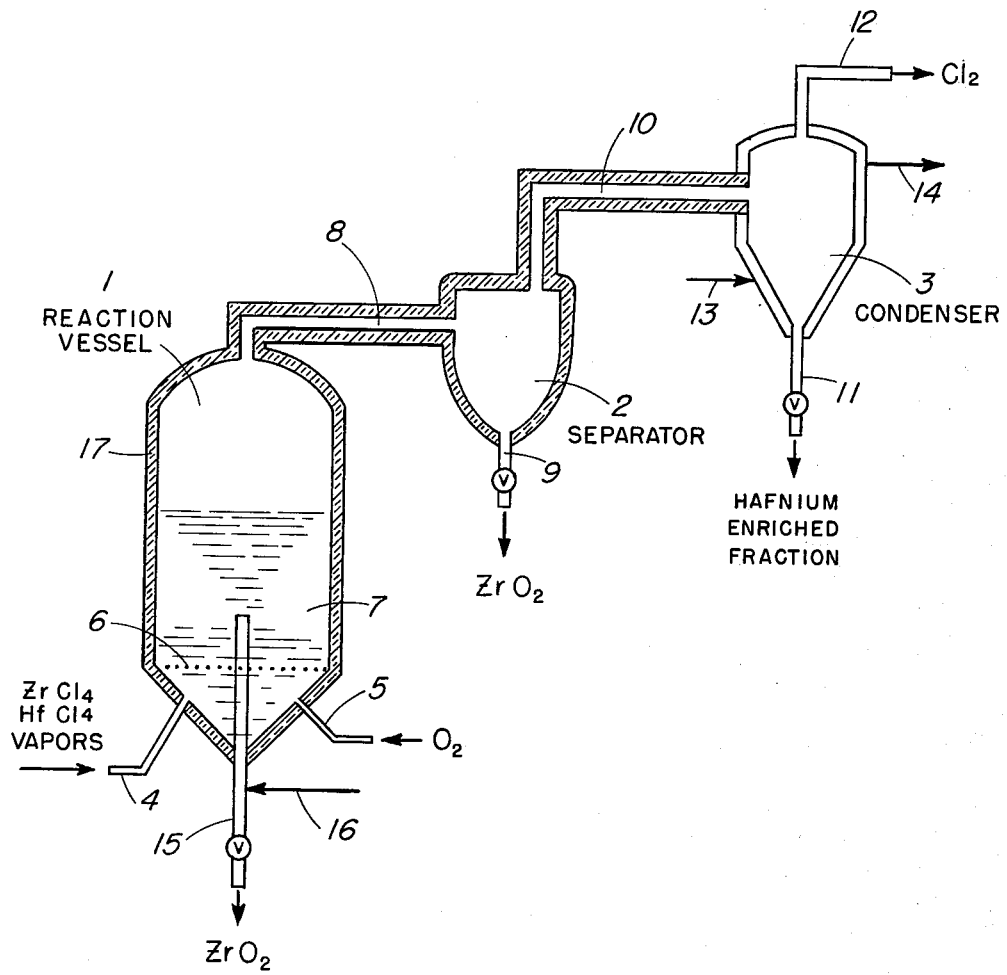

3,012,850
PROCESS FOR THE SEPARATION OF ZIRCONIUM AND HAFNIUM VALUES
Leo Berl, Cincinnati, Ohio, assignor to National Distillers and Chemical Corporation, New York, N.Y., a corporation of Virginia
Filed Nov. 15, 1957, Ser. No. 696,615
9 Claims. (Cl. 23—21)

This invention relates to a novel process for separating zirconium and hafnium compounds from mixtures thereof. More particularly, the method of the invention pertains to the treatment of mixtures of zirconium and hafnium tetrahalides to recover separately a hafnium-free reactor grade zirconium fraction and a hafnium-enriched fraction.

Recently, there have been increased demands for pure zirconium compounds and metal. The recovery of pure zirconium from zirconium ores has proven to be rather difficult, particularly with respect to separating zirconium from the hafnium with which it is normally associated in nature. One of the most common zirconium ores is zircon sand, a zirconium silicate, which has a hafnium content of about 2%, expressed as the ratio of hafnium to total hafnium and zirconium. Other known zirconium ores have hafnium contents as high as 20%. The separation of hafnium from zirconium in these ores has been found to be extremely difficult because of the similarity in the chemical properties of these two metals and their compounds. The unique nuclear properties of hafnium-free zirconium metal has, however, made such a separation imperative.

Numerous processes have been proposed for the separation of zirconium from hafnium, but these methods have proven to be very laborious and expensive. Consequently, such methods are not readily adaptable to commercial operations. An outline of available separation processes is found in the Journal of Chemical Education, 28, 529 (1951), and include such diverse methods as fractional crystallization, fractional precipitation, fractional distillation of $POCl_3$ addition compounds of zirconium-hafnium halides, etc. As noted above, the previously proposed methods are unsatisfactory for large scale operations because of the poor separations obtained, the high costs involved and the problems encountered in attempting to convert the recovered material to the metal or to useful compounds.

One object of this invention is to provide an effective method for separating zirconium from hafnium. Another object of the invention is to provide a separation process free of the difficulties encountered in the prior art processes and one which has commercial application. A further object is the preparation of reactor grade zirconium material. Other objects will become apparent from the ensuing description of the invention.

In accordance with the present invention, it has been found that when a mixture of zirconium and hafnium tetrahalides is subjected to controlled oxidation under special conditions the zirconium tetrahalide is preferentially converted to the oxide form. The resulting zirconium dioxide is then separated from the unreacted hafnium tetrahalide and by-product halogen gas. In a more specific embodiment of the invention, a vaporized mixture of zirconium and hafnium tetrachlorides is partially oxidized by passing the vaporized mixture together with oxygen gas through a highly agitated or fluidized bed of finely divided, hafnium-free zirconium oxide at elevated temperatures within the range of about 500° to 1250° C., preferably about 600° to 900° C. Stoichiometrically deficient amounts of oxygen are employed in the reaction, i.e. less oxygen will be used than is required to convert all of the zirconium tetrachloride to zirconium oxide in accordance with the following reaction:

$$ZrCl_4 + O_2 \rightarrow ZrO_2 + 2Cl_2$$

The amount of oxygen employed will be about 3 to 90%, preferably about 10 to 90%, of the stoichiometric amount. It will be understood, of course, that the amount of zirconium chloride converted to the oxide will vary directly with the amount of oxygen supplied to the reaction zone. Though a high degree of conversion is desirable, it has been found that effective purification can only be achieved if a considerable portion of the zirconium tetrachloride in the feed mixture is left unreacted. One possible explanation for the higher purity obtained with only partial oxidation would be the likelihood of oxidizing some of the hafnium tetrachloride if complete conversion of the zirconium tetrachloride were attempted. The use of the aforementioned catalyst is another important feature of this process, since lower temperatures and less oxygen may be employed without loss in efficiency or effectiveness.

Following conversion of the portion of the zirconium tetrachloride to the oxide, the unreacted zirconium tetrachloride together with all of the hafnium tetrachloride is carried out of the reaction zone along with the by-product chlorine gas. Preferably, the reaction should be carried out under such conditions that the gas stream leaving the reaction zone is substantially free of oxygen. The gas stream may contain some of the newly formed zirconium oxide; and, therefore, it is conveniently passed to a conventional device such as a cyclone separator for removing the entrained solids. In order to avoid condensing the zirconium and hafnium tetrachlorides at this stage of the process, the solids separator is maintained at a temperature above the sublimation temperatures of the zirconium and hafnium tetrachlorides. The solids-free vapors are next condensed in conventional equipment to recover the hafnium-enriched mixture of the tetrachlorides. The tail gas consisting largely of chlorine is separately recovered and advantageously may be utilized as such in the chlorination of zirconium ores.

Though the process of this invention has been described above utilizing a mixture of zirconium and hafnium tetrachlorides, it will be understood that other tetrahalides, such as the tetrabromides and tetraiodides, as well as lower halides, such as the trichlorides, of these metals also may be successfully employed. The use of zirconium and hafnium tetrachlorides is, however, preferred and particular features of the invention will be described below in conjunction with the use of this feed mixture. It will be further understood that the mixtures of zirconium and hafnium tetrahalides useful for the purposes of the present invention may be derived from any known source or process. Thus, for example, naturally occurring zirconium ores may be subjected to halogenation under well established conditions to obtain mixtures of zirconium and hafnium tetrahalides. The metal tetrahalide mixtures are preferably supplied to the reaction zone in the vapor state at temperatures of about 100° to 600° C.

The present invention will be more fully understood by reference to the accompanying drawing showing a diagrammatic flow sheet which may be employed in carrying out the inventive process. Referring now to the drawing, a vaporized mixture of zirconium and hafnium tetrachlorides is passed via line 4 into the lower portion of reaction vessel 1 while oxygen gas is introduced through inlet line 5. Though both of these reactants are shown to be introduced below grid 6, it is possible to pass them directly into the highly agitated or fluidized bed 7, which preferably comprises hafnium-free zirconium dioxide in a finely divided form capable of being agitated or fluidized under the conditions employed in reaction vessel 1. It will be understood, however, that other finely divided zirconium-containing material free of hafnium and other contaminating materials may also be effectively employed. Thus, for example, finely divided hafnium-free zirconium metal or zirconium alloys may also be effectively used in the process of this invention.

As previously noted, the amount of oxygen gas introduced into reaction vessel 1 is carefully controlled in order to obtain thereby preferential oxidation of the zirconium tetrachloride in the mixed metal chloride feed. The temperature in reaction vessel 1 is also controlled carefully to ensure an oxidation temperature within the range of about 500° to 1250° C. The exothermic heat of reaction will ordinarily be sufficient to maintain this temperature, and the temperature may be controlled by regulating the feed rates of the mixed metal chloride feed and the oxygen. In order to ensure that the temperature does not go below the temperature at which the zirconium and hafnium tetrachlorides will condense, reaction vessel 1 is substantially enclosed in indirect heating means 17. The zirconium tetrachloride and the oxygen will react on contact in agitated or fluidized bed 7 with the formation of zirconium dioxide and chlorine. Under suitably controlled operating conditions the bulk of the resulting zirconium dioxide will remain in reactor 1 while a small portion comprising zirconium dioxide fines will be carried out of the reactor by entrainment in the vapor flow of by-product chlorine and the unreacted hafnium and zirconium tetrachlorides. The zirconium dioxide formed in reaction vessel 1 may be recovered by any number of common engineering techniques. If continuous operation is desired, the build up of zirconium dioxide in the reactor may be avoided by continuously withdrawing the finely divided reaction product via standpipe 15. The method of operating such standpipes is well known in fluidized bed systems; and, in general, comprises passing an inert gas or, in the instant invention, oxygen gas into the standpipe via line 16 to enable the finely divided zirconium dioxide solids to be removed in a continuous manner free of contaminating metal chloride feed material. The zirconium dioxide recovered via line 15 is of sufficient purity to be properly called hafnium-fre zirconium dioxide.

The hafnium content of the zirconium dioxide fraction can be reduced, for example, to a value lower than 50 p.p.m., which is purer than specified for the use of zirconium metal in nuclear reactors. However, a complete separation of the two metals is difficult to carry out in one single dechlorination step, and in such cases it is necessary to rechlorinate the produced zirconium dioxide and to repeat the above described dechlorination procedure. On the other hand, complete purification from hafnium in one dechlorination step is commercially feasible provided that only a fraction, e.g. about 10 to 50%, of the introduced zirconium tetrachloride is oxidized while the unreacted portion leaves the reactor together with substantially all of the hafnium tetrachloride. Two fractions are recovered one of which is hafnium-free zirconium dioxide, suitable for producing reactor grade metal, while the other fraction comprises a mixture of unreacted zirconium and hafnium halides, which can be converted by well-known techniques to commercial zirconium metal. Moreover, the unreacted vapor fraction, largely consisting of a mixture of hafnium-enriched zirconium chloride and chlorine, can be recycled to the dechlorination furnace for further enrichment in hafnium. The hafnium-enriched mixture of the halides may also be subjected to any one of the known methods for hafnium-zirconium separation.

The unreacted metal chloride vapors and by-products chlorine gas exiting from reaction vessel 1 via line 8 is preferably passed into cyclone or separator 2 to ensure the removal of any entrained zirconium dioxide solids. The separated solids are recovered from separator 2 via line 9. It will be noted that the inlet and outlet lines as well as separator 2 are enclosed in the indirect heat exchange unit described with respect to reaction vessel 1. This will prevent the unreacted metal chloride vapors from condensing and clogging up the units or contaminating the zirconium dioxide product. After removal of any entrained zirconium dioxide, the metal chloride vapors and by-product chlorine gas are passed via line 10 into condenser 3 which is cooled with a heat exchange medium, such as water, entering the outer wall of condenser 3 via line 13 and exiting via line 14. The condensed hafnium-enriched metal chlorides are recovered via line 11 while the chorine gas is separately recovered via line 12.

The oxidation reaction may be initiated in reactor 1 by supplying the heat thereto or by heating the initial zirconium-hafnium halide vapors and the oxygen containing gas to a temperature sufficient to cause the oxidation to commence. It will be understood that reactor 1 is also initially supplied with finely divided, hafnium-free zirconium dioxide to provide the highly agitated or fluidized bed. As is well known, the required degree of agitation necessary to form the bed of finely-divided solids can be accomplished either by direct stirring, this feature not being shown in the drawing, or by the action of the incoming reactant vapors passing through grid 6. In place of pure oxygen gas, other oxygen-containing gases such as air may be supplied to reactor 1 without affecting the preferential nature of the oxidation reaction. The use of oxygen has the advantage, however, in that the whole reaction unit is simpler and smaller, the reaction products and unreacted materials are more readily recovered and heat transmission is facilitated. It is also contemplated that separator 2 may be completely by-passed if entrainment of zirconium dioxide either does not occur or does not reach an undesirable level. In this respect, the top of reactor 1 may be provided with baffles or with one or more small cyclone units through which the exiting vapors would have to pass. The separated zirconium dioxide would then drop back into fluidized bed 7. The shown method of controlling the temperature in reactor 1, lines 8 and 10, and in separator 2 may also be modified or replaced by other known engineering techniques for preventing condensation of reactants or reaction products by maintaining elevated temperatures. This invention is not limited to the use of a certain operating pressure, since it can be carried out under atmospheric pressure, under vacuum or under superatmospheric pressure.

The following examples are presented in order to show certain features of the invention.

*Example 1*

Using the flow plan and the apparatus described in the drawing, a vaporized mixture of zirconium and hafnium tetrachlorides, having a hafnium metal content of 2.1%, is passed through a fluidized bed containing 75 grams of finely divided, hafnium-free zirconium dioxide at a rate of 23 grams per hour along with 1.7 liters of oxygen. The temperature in the fluidized bed is maintained at about 725° C. After about three hours the reaction is discontinued and the unreacted zirconium and hafnium tetrachloride recovered via line 11 was analyzed. Arc spectrograph analysis show 5.4% hafnium on a metal basis, which amounts to an enrichment of over 250 percent.

The unreacted zirconium and hafnium tetrachloride fraction recovered above and now containing 5.4% hafnium is recycled through the fluidized bed of zirconium dioxide at a temperature of 800° C. with a metal tetrachloride flow rate of 23 grams per hour and an oxygen flow rate of 1.55 liters per hour. The unreacted zirconium-hafnium tetrachloride fraction obtained in this operation analyzed 9.0% hafnium.

Example II

Into a reaction furnace, as described in the drawing, 23 grams per hour of a mixture of zirconium tetrachloride and hafnium tetrachloride, having a hafnium metal content of 2.1%, is passed through a fluidized bed containing 100 grams of hafnium-free zirconium metal, over a period of four hours. Along with the vaporized halides 0.58 liter of oxygen per hour is passed through the fluidized bed at a reaction temperature of 650° C. at an operating pressure of 700 mm. Hg. After four hours of reaction the operation is discontinued. The amount of produced zirconium dioxide containing 0.005% of hafnium, is 12 grams, and the recovered mixture of unreacted zirconium tetrachloride and hafnium tetrachloride is 68 grams. Thus 25% of the introduced zirconium chloride is precipitated as substantially hafnium-free zirconium dioxide powder. The produced zirconium dioxide by known methods is chlorinated and the zirconium tetrachloride, thus obtained reduced with sodium or other known processes, to zirconium metal of reactor grade specification. The unreacted halides are converted to commercial zirconium metal having a hafnium content of 2.8%. After condensation of unreacted halides the tail gas consists of about 97% of chlorine and 3% of oxygen. The over-all zirconium yield is 98%.

The hafnium-free zirconium dioxide produced by the process of this invention may be used directly as such for many industrial operations. As described above, however, this compound may be effectively employed as starting material for the production of high purity zirconium metal useful in nuclear reactors. The conversion of the zirconium oxide to zirconium metal may be carried out by a known method such as direct halogenation followed by reduction with established reducing agents. Such methods, however, do not constitute essential features of the present invention. The recovered hafnium-enriched fraction may also be employed for many purposes. It is possible, for example, to build up the hafnium content by recycling to such an extent that highly purified hafnium tetrachloride may be recovered.

It is not intended to limit this invention to the use of an agitated or fluidized zirconium-containing material free from hafnium. A fixed bed catalyst, e.g. a layer of zirconium oxide or zirconium metal free from hafnium can be used as shown below.

Example III

A reaction vessel similar to that shown in the drawing is fitted with a grid or perforated disk constructed of hafnium-free zirconia. Particles of hafnium-free zirconium dioxide ranging in size from about ¼ to 1 inch are added to the reactor to form about an 8 to 12 inch bed supported by the grid or disk. A vaporized feed mixture of zirconium and hafnium tetrachlorides is then passed through the bed at a rate of about 23 grams per hour. The hafnium metal content of the feed mixture is 2.1%. About 0.67 liter per hour of oxygen is passed through the bed along with the tetrachloride feed. The selective oxidation of the zirconium tetrachloride is carried out at a temperature of 620° C. and a pressure of 720 mm. Hg for four hours. Nearly the entire zirconium oxide formed from the zirconium tetrachloride passes out of the reactor and is recovered in separator 2 in the form of a finely divided powder. About 14 grams of zirconium oxide is recovered, and it has a hafnium metal content of 0.006%. Unreacted zirconium and hafnium tetrachlorides are recovered by cooling in condenser 3. The recovered material amounts to 64 grams and has a hafnium metal content of 3%. The tail gas recovered via line 12 comprises about 97.5% chlorine and 2.5% oxygen. In order to obtain a high-purity zirconium and hafnium, it is also advisable to use high-grade raw materials, especially, halides which have already undergone some pretreatment for eliminating impurities such as silicon, aluminum, iron, titanium, vanadium, etc. Heating under vacuum and sublimation are known methods for such purification of zirconium and hafnium halides.

While this invention has been described and illustrated by the examples shown, it is not intended to be strictly limited thereto and other modifications and variations may be employed within the scope of the above description and the following claims.

What is claimed is:

1. A process for the separation of zirconium and hafnium values which comprises reacting a mixture of zirconium and hafnium tetrahalides vapors, said tetrahalides being selected from the group consisting of tetrachlorides, tetrabromides and tetraiodides, with an oxygen-containing gas at a temperature within the range of about 500° to 1250° C. in an agitated bed of hafnium-free zirconium material selected from the group consisting of zirconium dioxide and zirconium metal, said oxygen-containing gas having an oxygen content of about 3 to 90% of the stoichiometric amount required to react with all of the zirconium tetrahalide in said feed mixture, and separately recovering substantially hafnium-free zirconium dioxide and unreacted zirconium and hafnium tetrahalides.

2. The process of claim 1 wherein said tetrahalides are tetrachlorides.

3. The process of claim 1 wherein said zirconium material is zirconium dioxide.

4. The process of claim 1 wherein said zirconium material is zirconium metal.

5. A process for the separation of zirconium and hafnium which comprises reacting a vaporized mixture of zirconium and hafnium tetrahalides, said tetrahalides being selected from the group consisting of tetrachlorides, tetrabromides and tetraiodides, with an oxygen-containing gas having an oxygen content of about 3 to 90% of the stoichiometric amount required for complete oxidation of the zirconium tetrahalide at a temperature of about 500° to 1250° C. in a fluidized bed of finely divided hafnium-free zirconium dioxide to obtain selective oxidation of the zirconium tetrahalide to zirconium dioxide substantially free of contaminating hafnium, and separately recovering said hafnium-free zirconium dioxide and an enriched-hafnium tetrahalide fraction containing unreacted zirconium and hafnium tetrahalides.

6. The process of claim 5 wherein said separately recovered hafnium tetrahalide-enriched fraction is subjected in vapor state to a solids separation treatment to remove therefrom entrained zirconium dioxide solids.

7. The process of claim 5 wherein said oxygen-containing gas is air.

8. The process of claim 5 wherein said oxygen-containing gas is oxygen.

9. The process of claim 5 wherein the reaction temperature is about 500° to 900° C.

References Cited in the file of this patent

UNITED STATES PATENTS

| | | |
|---|---|---|
| 2,240,343 | Muskat | Apr. 29, 1941 |
| 2,658,822 | Hengstebeck | Nov. 10, 1953 |
| 2,716,587 | Hillard | Aug. 30, 1955 |

FOREIGN PATENTS

| | | |
|---|---|---|
| 541,343 | Great Britain | Nov. 24, 1941 |